United States Patent [19]

Felter

[11] 4,178,912

[45] Dec. 18, 1979

[54] SOLAR HEATING SYSTEM

[76] Inventor: John V. Felter, P.O. Box 7464, Houston, Tex. 77008

[21] Appl. No.: 823,088

[22] Filed: Aug. 9, 1977

[51] Int. Cl.² .............................................. F24J 3/02
[52] U.S. Cl. .................................. 126/452; 165/170; 165/171; 165/107 R; 126/431; 126/449
[58] Field of Search ............... 126/270, 271; 237/1 A; 165/107, 48, 49, 171, 173, 170; 52/309, 616, 618

[56] References Cited

U.S. PATENT DOCUMENTS

| | | | |
|---|---|---|---|
| 1,742,861 | 1/1930 | Johnson | 126/271 |
| 3,965,887 | 6/1976 | Gramer | 126/271 |
| 3,980,071 | 9/1976 | Barber, Jr. | 237/1 A |
| 4,000,850 | 1/1977 | Diggs | 237/1 A |
| 4,018,211 | 4/1977 | Barr | 126/270 |
| 4,020,989 | 5/1977 | Kautz | 237/1 A |
| 4,036,209 | 7/1977 | Press | 126/271 |
| 4,066,118 | 1/1978 | Goettl | 126/270 |
| 4,074,705 | 2/1978 | Robinson, Jr. et al. | 237/1 A |
| 4,098,260 | 7/1978 | Goettl | 126/270 |

FOREIGN PATENT DOCUMENTS 257425  5/1963  Australia ................................. 126/271

*Primary Examiner*—James C. Yeung
*Attorney, Agent, or Firm*—Carl B. Fox, Jr.

[57] ABSTRACT

Solar heating system, wherein solar heating assemblies are adapted to form the roof of a structure. The solar heating assemblies may not occupy the entire surface area of a roof, but the upper sheathing elements of the solar heating assemblies may extend over the entire roof area so that no other provision for roofing of the structure is necessary.

27 Claims, 21 Drawing Figures

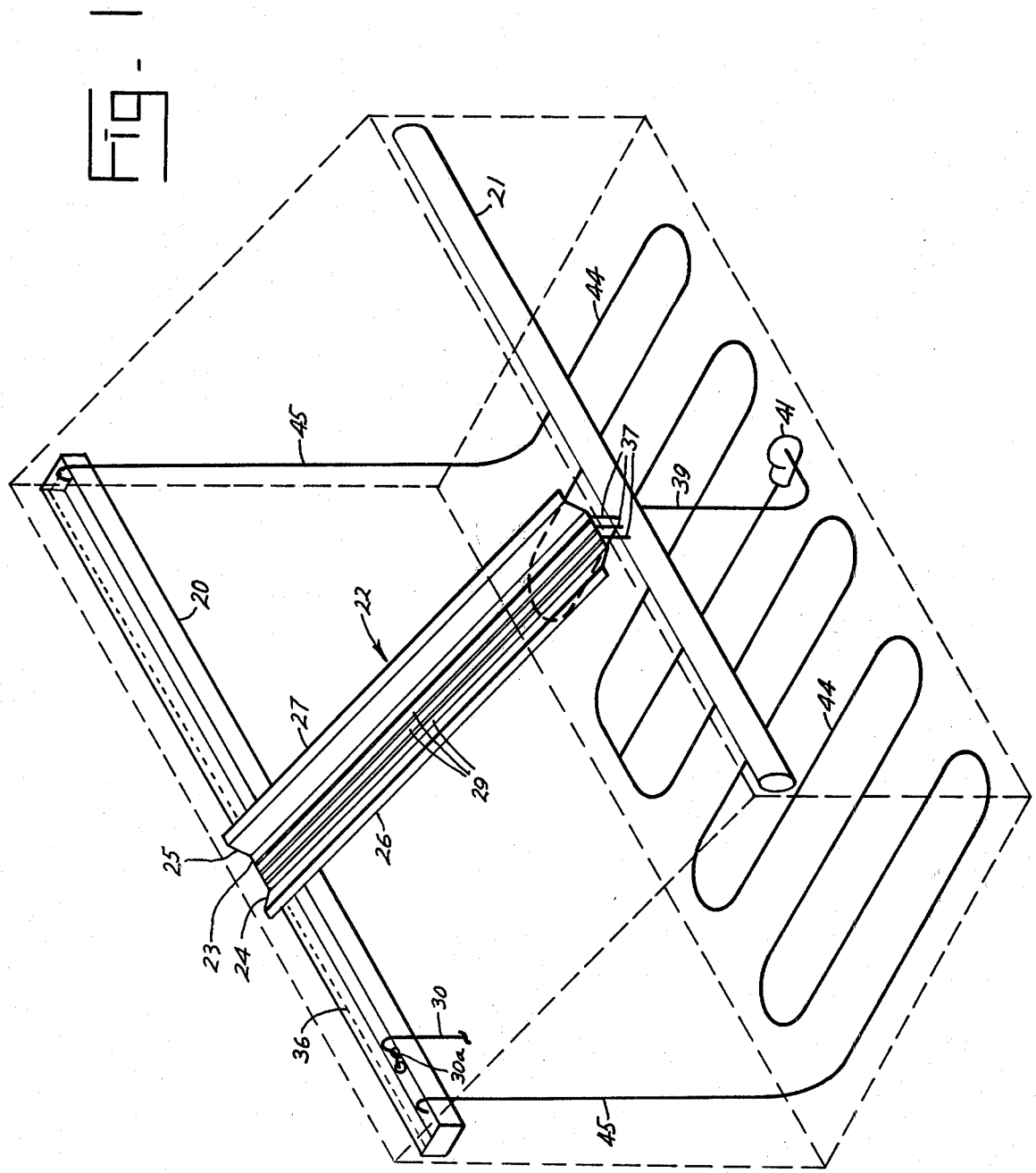

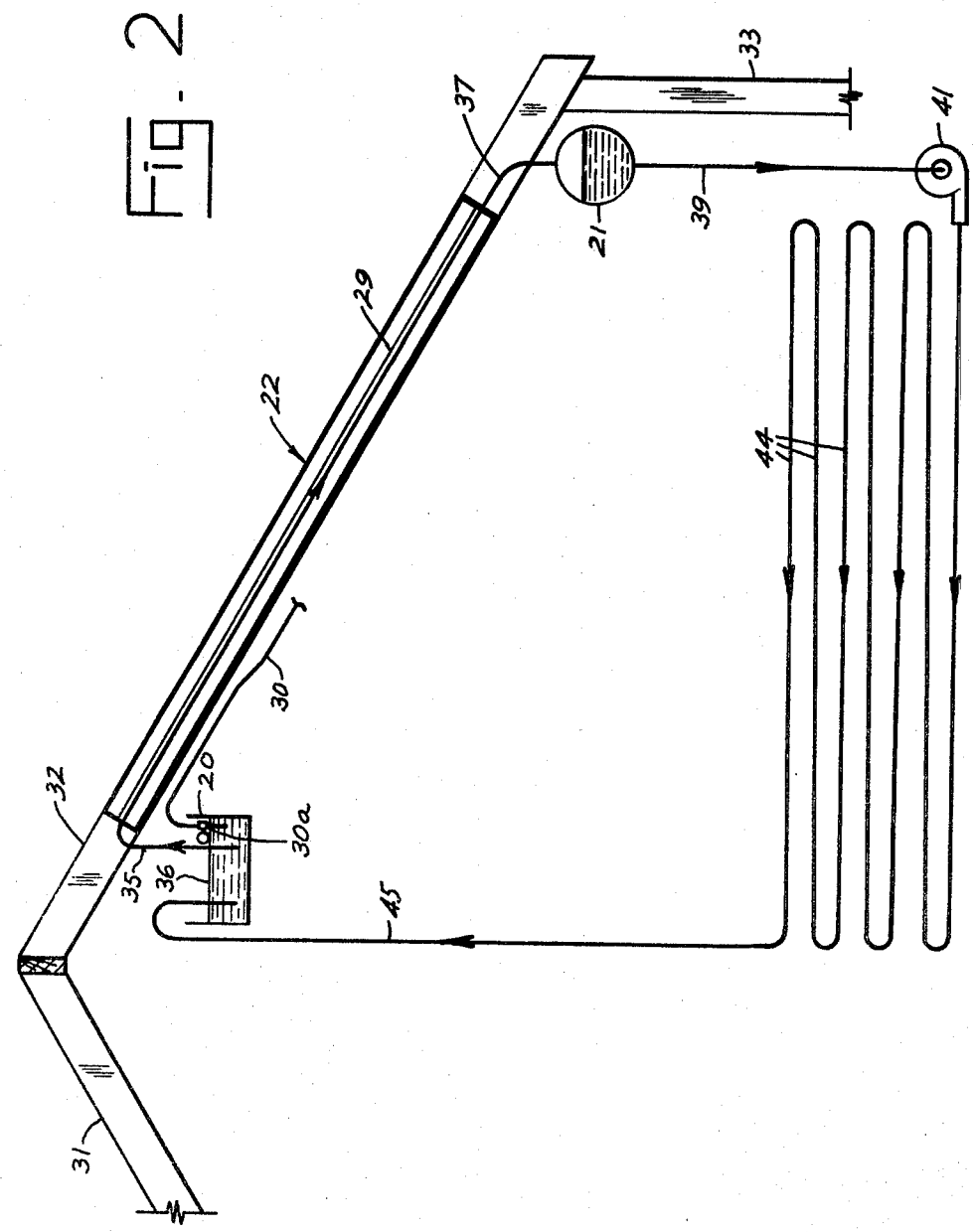

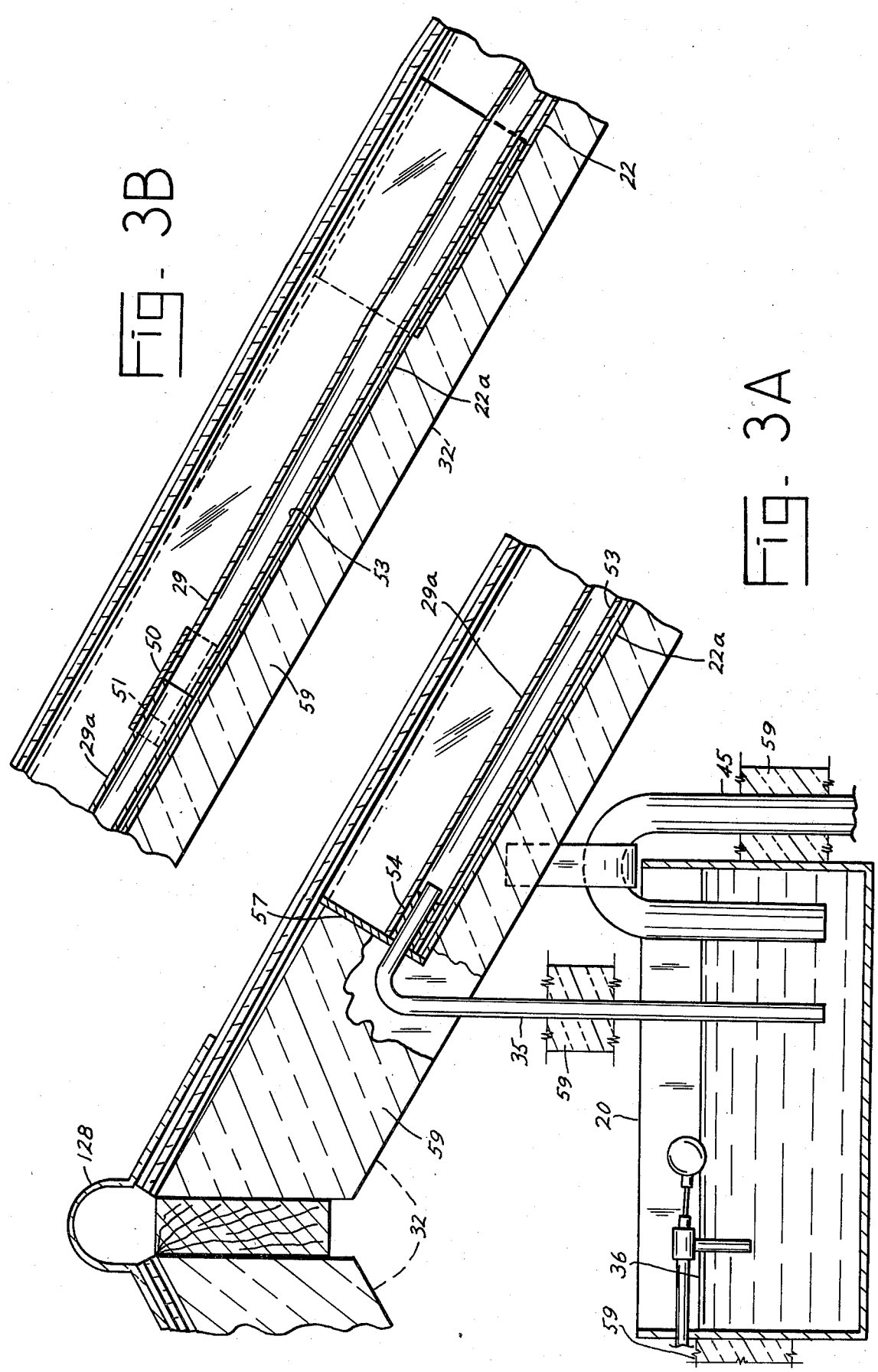

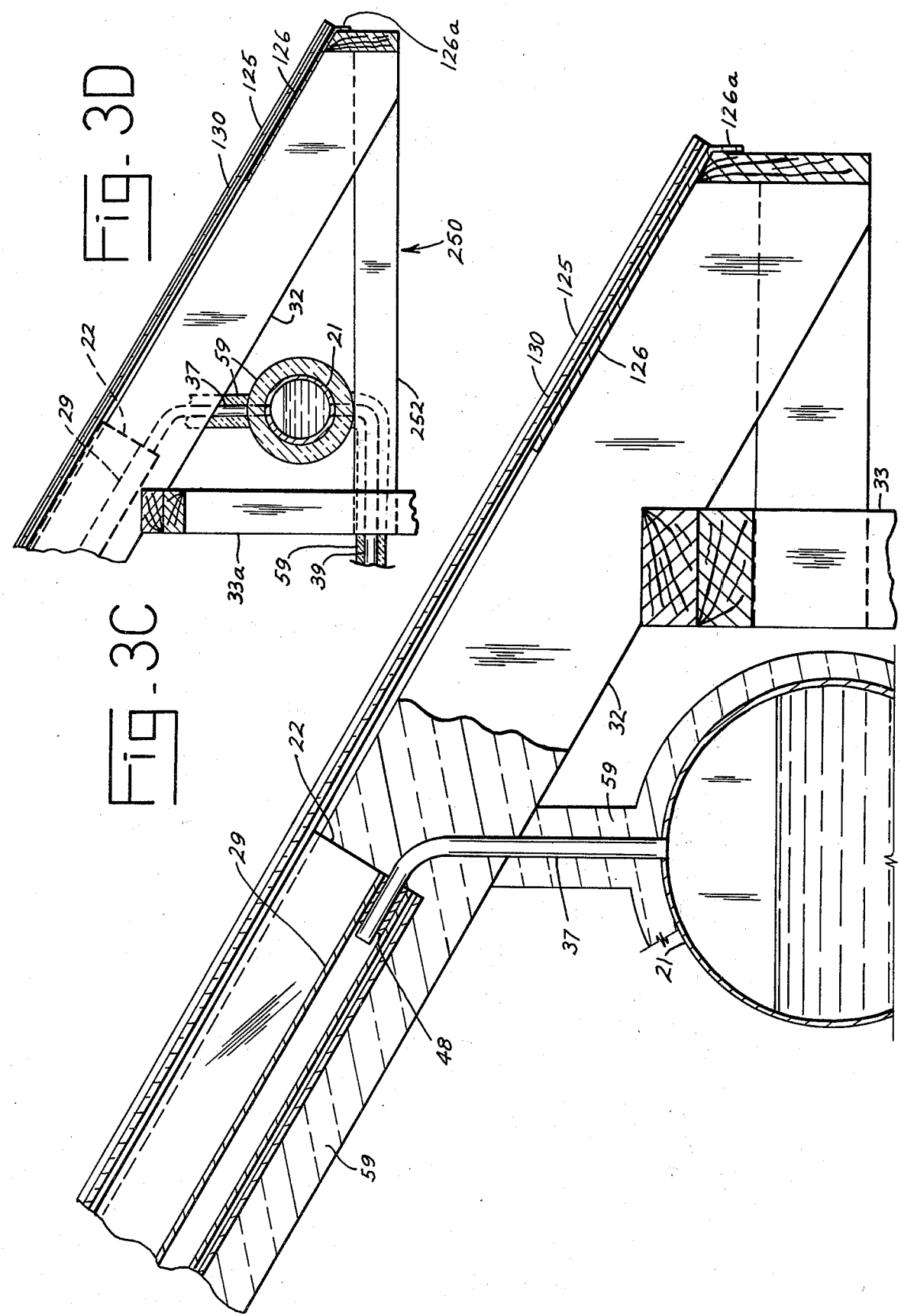

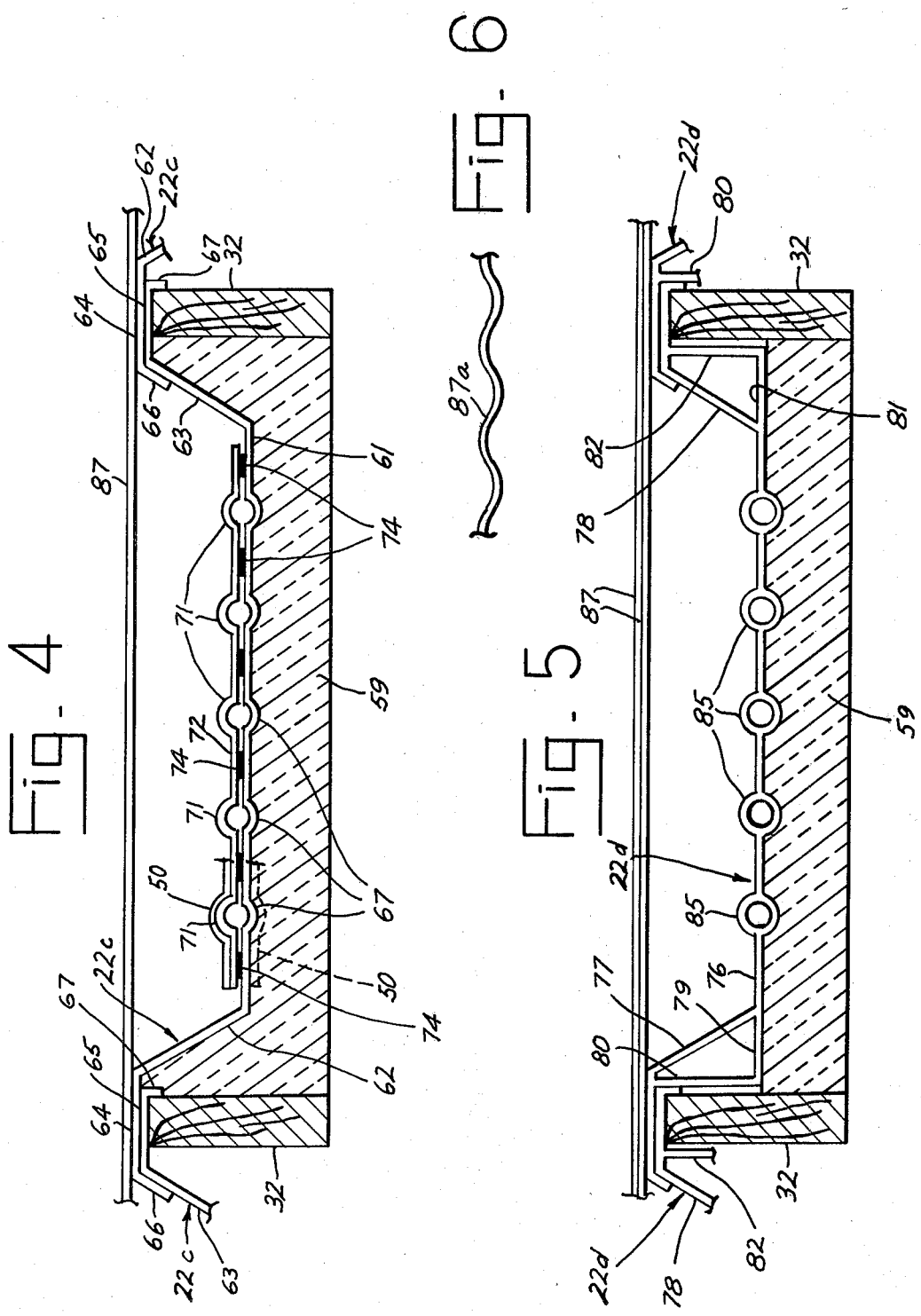

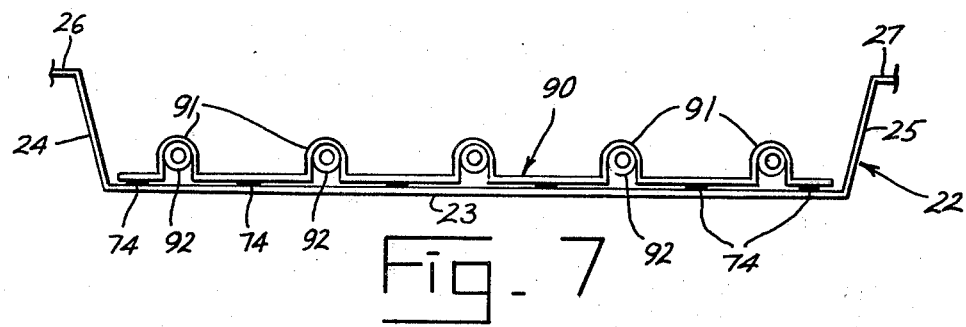
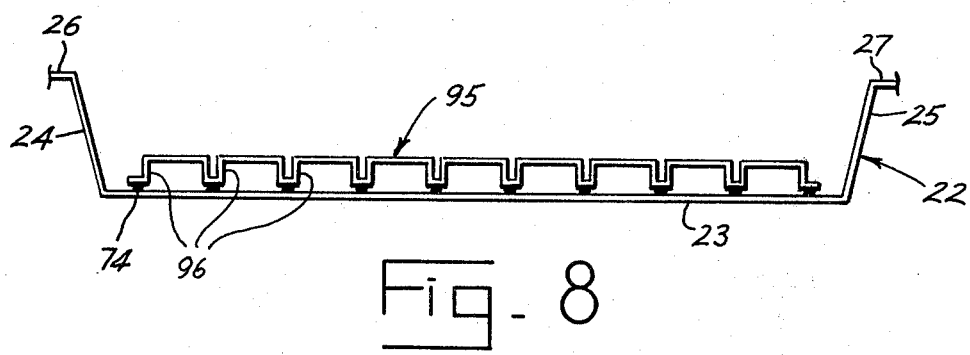
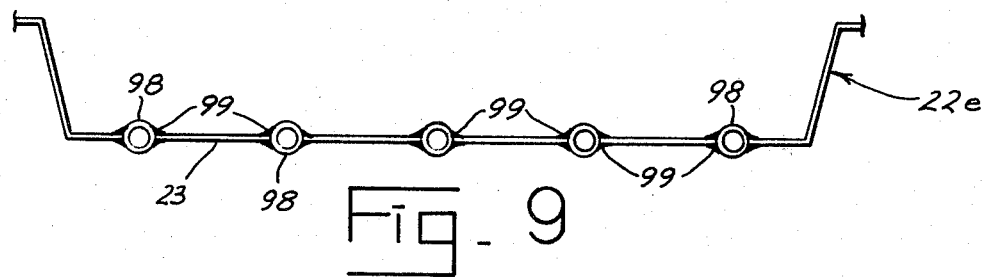
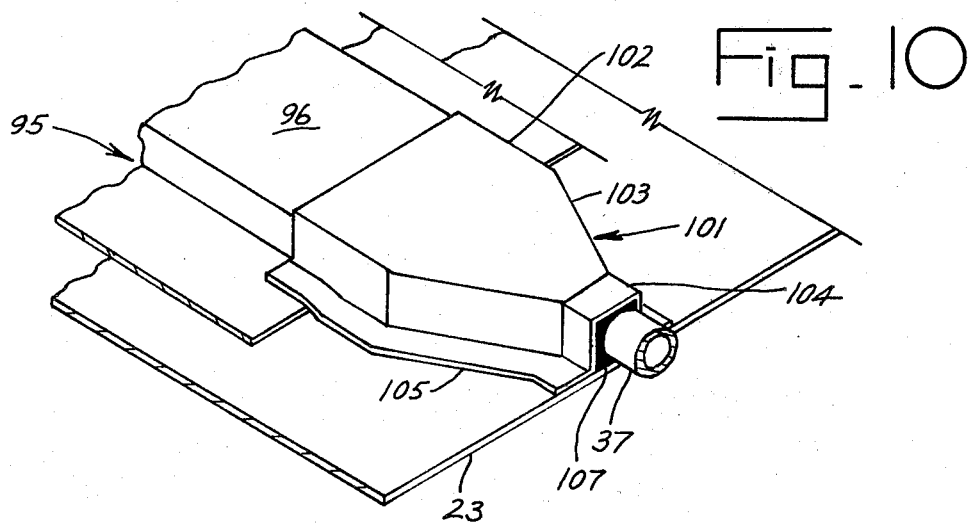

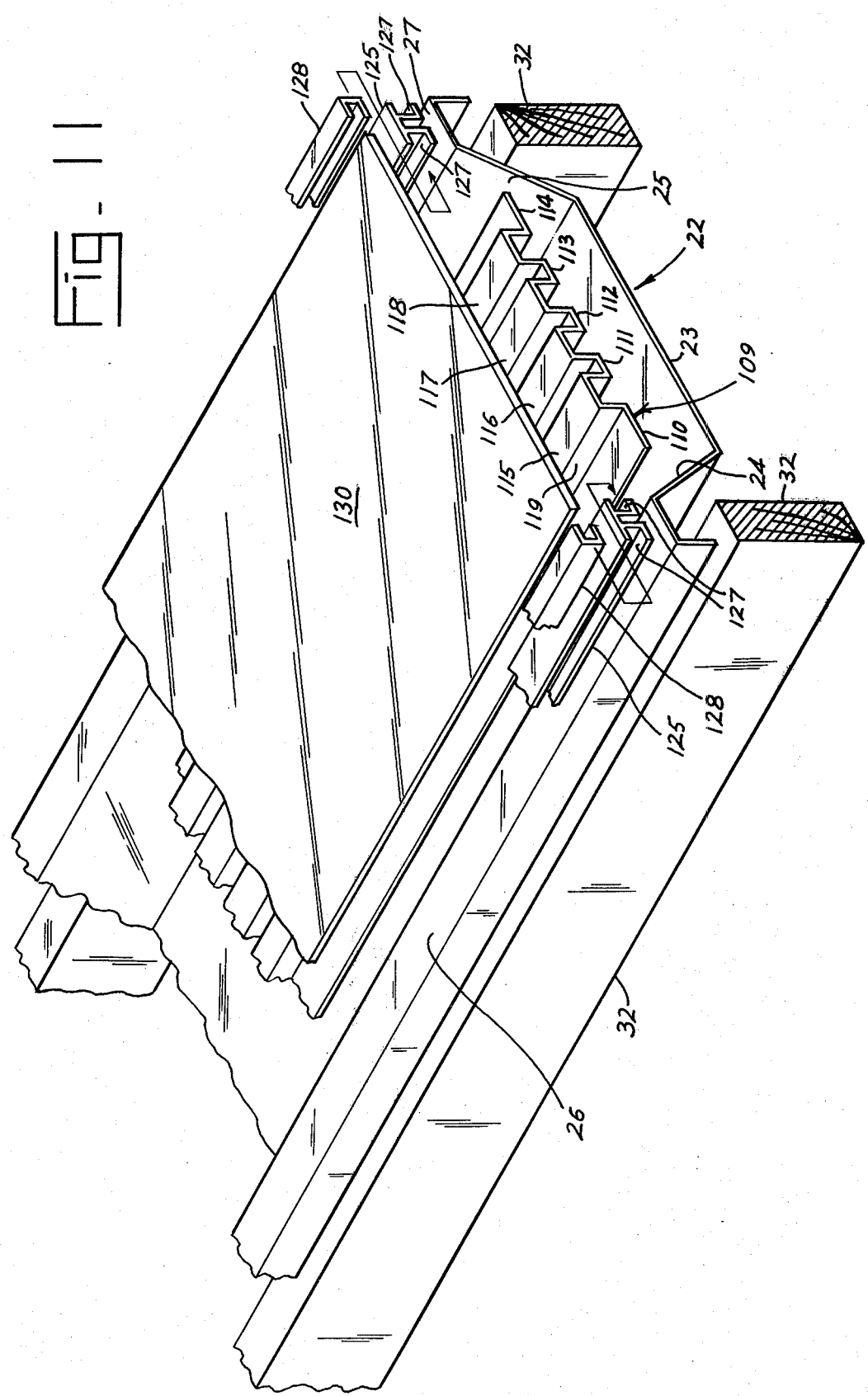

SOLAR HEATING SYSTEM

BACKGROUND OF THE INVENTION

The solar heating panels and assemblies which have been provided in the art are universally designed to be installed over a conventional roof or wall of a structure. This is wasteful in that both the conventional roof or wall and the solar heating assembly must be provided over the area occupied by the solar heating assembly. The solar heating panels which have been provided in the art have without exception been designed to be highly efficient, so that as small a unit as possible may be used. But since the entire roof area is exposed to the sun, the entire roof area may be used to collect solar energy. Heat derived from solar radiation may be received and used by solar heating assemblies covering the entire roof area, and which also provide the roof for the structure, thereby saving total expense of equipment and installation, since the conventional roof or wall is omitted.

Solar heating assemblies or panels installed upon the roof or wall of a building are unsightly, since they project from the roof or wall surface and are of different appearance than the roof of the wall. In order to gain access to the solar heating panels installed upon a roof or wall, holes through the roof or wall must be made for such things as flow pipes. Insulation of such assemblies is difficult. Solar heating panels installed upon a roof surface and projecting outwardly therefrom are highly subject to damage as a result of falling limbs, storms, and the like. By making the solar panels perform as the roof or wall of a structure, no projecting elements are used and the roof has a uniform overall appearance which is attractive and in good taste.

SUMMARY OF THE INVENTION

According to the invention, solar heating assemblies are provided to bridge the openings between the rafters of a roof, and to form the roof for the structure. The bridging elements are in the form of troughs which have parallel flanges along their sides adapted to rest on the rafters and provide a recess below the upper levels of the rafters within which solar heat collection elements may be disposed. A sheath or covering layer provides a roof surface above the assemblies, and preferably extends beyond the terminations of the solar heat collection assemblies to cover the entire surface of the roof.

In the usual solar heating system, the water or salt solution which is employed to collect and transfer the heat to a storage or use area is pumped upwardly through the solar heating elements. In the case of the failure of some portion of the heat collection assembly, the heat transfer medium continues to be pumped upwardly toward the roof and considerable damage due to leakage thereof may occur. According to the present invention, the heat transfer medium is syphoned from a storage vessel near the peak of the roof, so that should a leak occur, the smaller amount of leakage will occur with resultant lesser damage to the building structure.

Because of the fact that the solar heating collection assemblies according to this invention may be larger than those normally employed, they may be made of lesser overall efficiency and thereby cheaper, so that while a larger heat collection area is provided its cost may well be less than that of a smaller high efficiency heat collection assembly. Furthermore, since the solar heating assemblies according to this invention provide the roof for the structure, an overall savings in cost which may be considerable can be realized.

The apparatus according to the invention is designed to be easily installed, so that if desired it may be installed by the homeowner himself, on a do-it-yourself basis. The troughs which form the principal structures of the apparatus are easily installed by simply laying their edge flanges along adjacent rafters. The troughs may be supplied in any convenient lengths, and may be trimmed at their ends to fit particular installations. The trough units may be installed in lapped arrangements, to reach from the bottom to the top of a roof.

In some forms of the apparatus, the heat collection tubes are integral with the trough units. In other forms of the apparatus, the heat collection tubes are provided as separate units which are installed by simply cementing or gluing them along the bottoms of the troughs, using a cement or glue which is resistant and stable with respect to the heat and liquids to which it will be exposed. Easily installed fittings are provided for connection of water or other liquid circulation conduits to the upper and lower ends of the heat collection tubes, and for connecting the heat collection tubes ends to end from the bottom to the top of the roof. As in the case of the trough units, the heat collection tubes, if separate from the troughs, may be made in lengths which are easy to handle and install, even by the do-it-yourselfer.

The upper sheath or covering which forms the outer roof surface is of a form subject to easy installation, in some forms easier than the installation of an ordinary roof.

The water circulation tank employed with the invention to supply water, or sometimes another fluid, to the upper ends of the heat collection tubes may be in the form of a single elongate tank, or may be, for the do-it-yourselfer, in the form of a separate tank for each trough. The lower tank which receives heated water from the heat collection tubes is preferably in the form of a long pipe, and this may be assembled from shorter lengths of pipe in conventional manners.

In accord with the concept that greater overall economies and efficiencies may be enjoyed by providing larger heat collection assemblies of relatively lower cost, and having somewhat less heat collection efficiency per square foot than can be obtained from more expensive assemblies, all components of the invention are preferably made of relatively low cost materials such as sheet metal (e.g. galvanized iron or aluminum) or plastic (e.g. polyvinyl chloride). The surface sheathing may be made of either glass or sheet plastic.

For adequate heat collection, it is necessary that the roof surface sheathing be of a material through which solar radiation will penetrate, such as glass or a transparent or translucent plastic. Solar radiation penetrations of such materials may be as high as eighty or ninety percent, or even higher.

After the solar radiation has passed through the roof sheathing, it is necessary to collect or trap enough energy in the form of heat to make the system at least fairly efficient. For this purpose, the heat collection tubes may be painted or coated with, or be made of, a material which is of a dull black or dark color and which is largely nonreflective. Both sheet metal and plastic may be painted or coated for this purpose, without difficulty.

After collection of the heat in water or another liquid carrier or medium, it is necessary to reasonable efficiency that as little as possible of the heat from the water or other liquid be lost. To this end, insulation is provided at the undersides of the trough structures and around the pipes, tubes and tanks which are at elevated temperatures.

In the interest of maximum solar heat collection, it is preferred that the system be used on a roof area which is directed as nearly perpendicular as possible toward the direction of the sun, especially during the winter months.

From the standpoint of economy and simplicity, water is the preferred heat transfer fluid, since it is readily available and does not present unusual handling and corrosion problems.

A principal object of the invention is to provide a solar heating system which forms the roof of a structure. Another object of the invention is to provide such a system wherein a large heat collection area is provided, at minimum cost. A further object of the invention is to provide such a system wherein heat transfer medium circulation is provided in the opposite direction than is employed with conventional solar energy systems. Yet another object of the invention is to provide such a system which is economical, attractive, and efficient in use.

Other objects and advantages of the invention will appear from the following detailed descriptions of preferred embodiments thereof, reference being made to the accompanying drawings.

BRIEF DESCRIPTIONS OF THE DRAWINGS

FIG. 1 is a schematic perspective view of a preferred embodiment according to the invention.

FIG. 2 is an end view showing the embodiments of the invention shown in FIG. 1.

FIGS. 3A, 3B and 3C are vertical cross sections showing the preferred embodiment of the invention, FIG. 3A showing the upper portion, 3B the central portion, and 3C the lower portion. FIG. 3D is a reduced vertical cross section showing the apparatus of FIG. 3C in a modified installation.

FIGS. 4 and 5 are end view of modified embodiments of the invention.

FIG. 6 illustrates a further modification of the invention.

FIGS. 7-9 illustrate further modifications of the solar heat collection assembly.

FIG. 10 is a perspective view illustrating an end connection fitting useful in connection with the invention.

FIG. 11 is an expanded perspective view illustrating a form of the invention.

DESCRIPTION OF THE PREFERRED EMBODIMENTS

Figure 12:
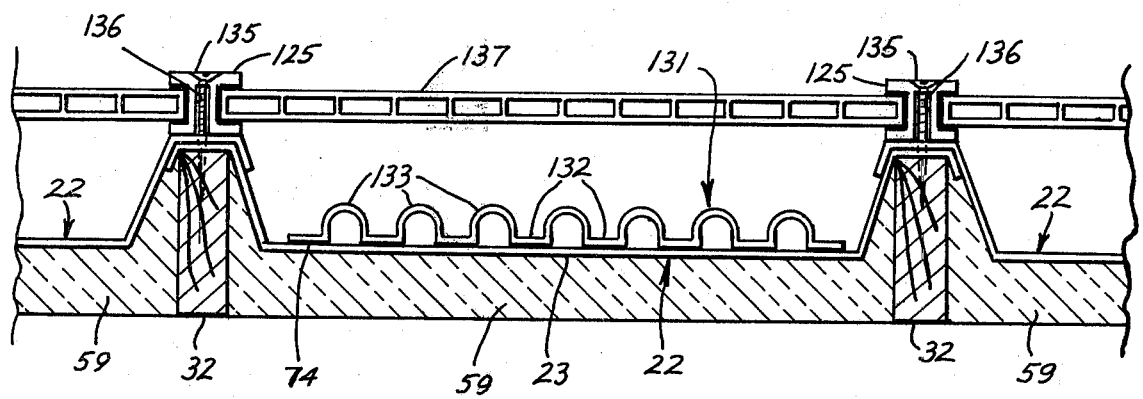
FIG. 12 is an end view showing another embodiment of the invention.

Referring now to the drawings in detail, and first to FIGS. 1 and 2, the dashed lines in FIG. 1 indicate the general shape of a building structure having an inclined roof. An elongate tank 20 is supported beneath the higher edge of the roof. A tank 21 in the form of a cylindrical pipe is supported beneath the lower edge of the roof. A series of troughs 22, only one being shown, which may be constructed of sheet metal or of plastic, each has a flat bottom 23 and angularly inclined sides 24, 25 along the outer edge of each of which is provided a flange 26, 27, respectively. The troughs 22 are installed between adjacent rafters of the roof area. A plurality of solar heat collection tubes 29 are disposed along bottom 23 of each trough 22. A pipe 30 leading from a suitable water supply and controlled by float valve 30a supplies make-up water to tank 20 to maintain a constant level of water therein. Heat transfer liquids other than water may be used.

Referring to FIG. 2 of the drawings, the building structure is shown to have opposite rafters 31, 32 and a series of wall studs 33. The building structure will, of course, be considerably more complicated and complete than is shown. Each of the heat collection tubes 29 has a flow connection 35 at its upper end extending from beneath the surface of liquid 36 in tank 20. A flow connection 37 connects the lower end of each tube 29 with the upper part of cylindrical tank 21. A pipe 39 delivers liquid from the bottom of tank 21 to a pump 41 which pumps the liquid through a series of pipe coils 44. Pipe 45 delivers the liquid from the last of the pipe coils 44 upwardly to tank 20. The pipe coils may be in a single series as in FIG. 2, or may be in parallel series as in FIG. 1.

As can be readily observed from FIGS. 1 and 2, the liquid circulating through the system is not pumped upwardly from a supply tank through the heat collection elements at the roof. Instead, the liquid is syphoned, under vacuum or suction, through pipes 35 leading to heat collection tubes 29, and drains into tank 21 through pipes 37. In this way, it is provided that the solar heat collection tubes are not under high pressure so that should a leak develop the system will stop operating if the leak is large and will operate at a reduced efficiency if the leak is smaller. This provision results in the lessening of damage due to leaks should a failure occur. The apparatus according to the invention may be used as in conventional systems if desired, with liquid impelled upwardly through the solar heat collection tubes by one or more pumps. The pipe coils 44 may be disposed in the floor of the structure, as shown in FIG. 1, or may be installed in the walls of a structure, or in both the floor and the walls, as desired.

According to the concept of the invention, the materials employed for the structure of the solar heat collection system and roof covering are made as economical as possible consistent with dependability and at least a fair degree of efficiency. The solar heat collection tubes 29 may be made of a material such as polyvinyl chloride plastic, or may be made of galvanized iron, copper, aluminum, or the like. The components of the system are of such a nature that they are well adapted to installation on any building structure having suitable rafter supports or to which similar supports may be added. The apparatus may readily be installed on a do-it-yourself basis, since the components are standardized and may be adapted to different sizes of roofs, different slopes of roofs, and other variable features.

Referring now to FIGS. 3A, 3B, and 3C, the sheet metal or plastic trough 22 is supported by parallel rafters 32 in the manner already mentioned. Further description of the manner of support of trough 22 will be explained in connection with other drawing figures. The heat collection tubes 29, one being shown, each has a lower drain pipe 37 sealed to its lower end by an adapter element 48 which fits the outer surface of the pipe 37 and the inner surface of the tube 29. Adapter 48 is fixed in place by an adhesive. Each pipe 37 drains fluid from a tube 29 into the cylindrical storage tank 21, as shown in FIG. 3C.

Referring to FIG. 3B, a lower trough element 22 is shown connected to an upper trough element 22a, the upper element 22a being lapped over the lower element 22 and preferably bonded thereto by a suitable adhesive such as an epoxy or asphaltic glue or cement. Various kinds of putty can be used. Although in FIG. 3B the elements 22, 22a are shown to require noticeable bends for connection, only the slightest of bends are actually required since the elements are relatively thinner walled than is shown in the drawing. It is not possible to show material such as sheet metal and thin plastic in proper proportions in a drawing of the scale here required. In FIG. 3B, it is shown that the lower solar heat collection tube 29 is connected to an upper solar heat collection tube 29a by an adhesively connected sleeve element 50 which fits the upper and side surfaces of the tubes 29, 29a and which has side flanges or webs 51 which are adhesively connected to base 53 of the solar heat collection tube assembly, the latter to be further explained in connection with other drawings. From FIG. 3B, it is clear that a roof of any dimensions may be made using components herein described. The spaces between adjacent rafters of a roof may be bridged by troughs 29, the troughs 29 being overlapped both in lateral and upward directions so that a complete weatherproof covering of the roof area is obtained. Likewise, the solar heat collection tubes 29 may be connected end-to-end in any number to provide the necessary length from the upper to the lower part of the heat collection system and the roof. Furthermore, all of the components may be either supplied in any desired lengths and sizes to fit roof areas of different dimensions, or may be made in relatively short lengths to be assembled to cover roofs of any dimensions.

Referring now to FIG. 3A, it is shown that the upper heat collection tube 29a is connected at its upper end to pipe or tube 35, which extends to below the liquid level 36 within tank 20, by an adhesively connected adapter 54 which fits the interior of tube 29a and fits the exterior of tube 35, and is securely cemented in place in a leak proof manner.

An end plate 57 adapted to close the upper end of tube 22a may be provided if desired, or the insulation 59 provided between adjacent rafters and beneath the troughs 22, 22a may itself provide the ends for the trough members. As has been stated before, the idea of the invention is that a solar heat collection system of less expensive nature than other more efficient systems is provided in order that it may be deployed over substantially the entire roof area of a building. Because of the larger area exposed thereby to sun radiation, the heat received thereby will in many cases be higher than can be achieved using a smaller more efficient solar radiation collection system. At the same time, a roof for the structure is provided at no additional cost or installation expense, so that the overall economy and efficiency of the system according to the invention is very high.

Figure 15:
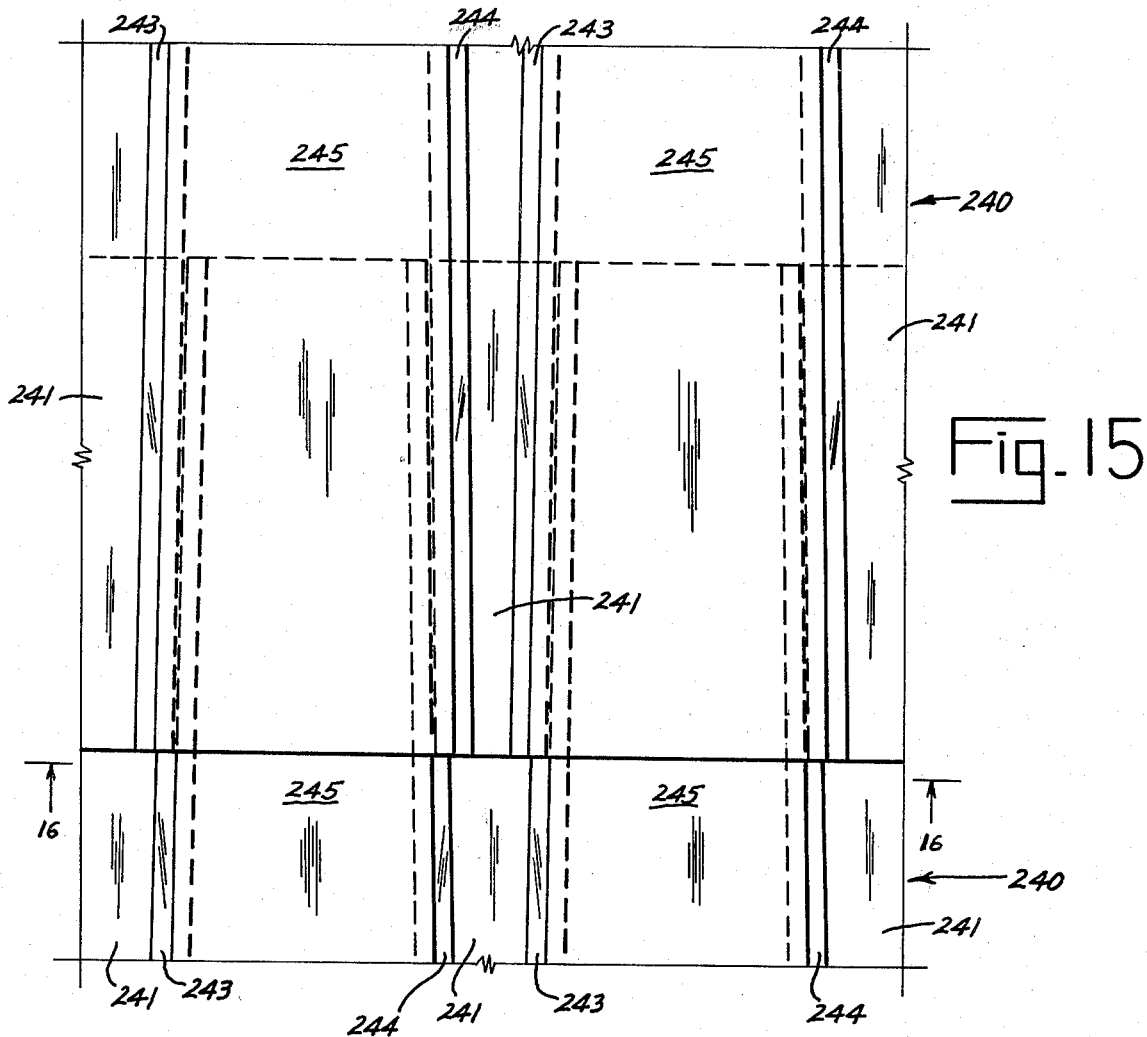
FIG. 15 is an enlarged plan view of a fluid tube structure connection according to the invention.
Figure 16:
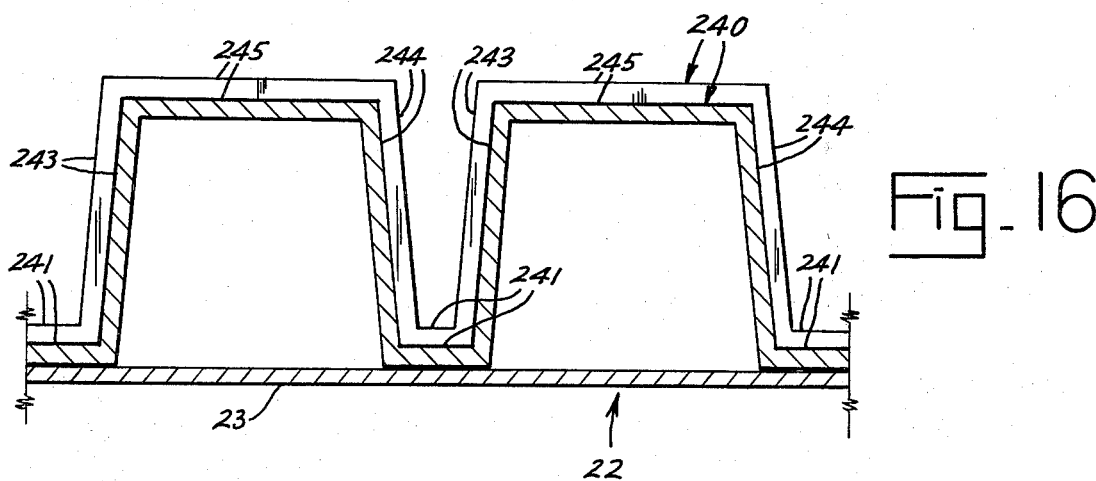
FIG. 16 is a vertical cross section taken at line 16—16 of FIG. 15.

In FIGS. 15-16 there is shown apparatus wherein the heat collection tubes 29 may be connected end-to-end in an overlapped arrangement, instead of through the use of the sleeve-like connectors 50 shown in FIG. 3B. The FIG. 15-16 structure is preferred over that shown in FIG. 3B. The heat collection tube structures 240 have flat bottom walls 241 which are sealed to bottom wall 23 of trough 22 by a suitable adhesive or bonding material, and have angled sidewalls 243, 244 and flat top walls 245. Walls 243-245 are enlargingly tapered from one end to the other, so that the angularly lower end of one structure 240 (angularly disposed downwardly along the pitch of a roof) will engage over the angularly upper end of another structure 240, the angularly downward direction being toward the bottom of FIG. 15. In FIGS. 15-16, the wall thicknesses and degrees of taper are exaggerated somewhat. The taper from one end of a structure 240 to its opposite end will depend on the wall thicknesses, and will be such that the tube structures will be widened by twice the wall thickness from the upper end of a structure 240 to the lower end of the structure 240. For materials having relatively thinner wall thicknesses, such as sheet metal, the tapers will be relatively smaller. For materials having relatively thicker wall thicknesses, the tapers will be relatively greater. The tapers in all cases will be small. Any number of structures 240 may be overlapped end-to-end to extend from the top to the bottom of a roof. The structures 240 are adhesively connected at the overlaps, to be leakfree.

FIG. 3D shows a preferred location for the tank 21. Tank 21 may be relatively larger, as shown in FIG. 3C, or may be relatively smaller, as shown in FIG. 3D. The functions of tank 21 is to serve as a manifold to collect the liquid flowing downward from the heat collection tubes, so that the liquid can be conveyed through a system for use of the heat collected. Tank 21 may receive liquid from a group of heat collection tubes or from all of the heat collection tubes.

In FIG. 3D, tank 21 insulated by insulation 59 is disposed within an eave 250 of a building structure. The reason that this location for the tank or tanks 21 is preferred is because it, being a lower location, permits the troughs 22 (of whatever form) to extend outwardly and downwardly past the outer wall of the building, the studs 33a forming parts of the outer wall and indicating its location.

The troughs 22, overlappingly supported by the rafters, form a secondary roof for the building. In the event that the upper roof covering 130 (to be described later) or any other of the forms of roof covering or sheathing disclosed herein should leak, the troughs 22 will prevent the leaking water from passing down into the building and possibly causing damage. By locating the lower ends of the lowermost troughs 22 outside of the building wall, any leakage will be drained to outside of the building wall where damage resulting therefrom will be absent or at least minimal.

In FIG. 3D, tank or pipe 21 is shown supported by members 252 extending from studs 33a to the ends of rafters 32, within the eave 250. Insulated pipe 37 connects the lower ends of the heat collection tubes 29 with the pipe or tank 21. Pipe 39, also insulated, conveys the heat collecting liquid from pipe 21 to the heat use location, as shown in FIGS. 1 and 2 of the drawings.

Referring now to FIG. 4 of the drawings, the trough 22c shown therein has a flat central or bottom wall 61 and inclined sidewalls 62, 63. The flanges 64, 65 along the upper edges of wall 62, 63, respectively, are adapted to overlap the rafters 32 in the manner shown, to be supported thereby. Downturned flange 66 overlaps the flange 65 and wall 63 of adjacent trough 22c, and downturned flange 67 is disposed around the corner of the rafter 32, as shown. The downturned flanges 66, 67 prevent downward leakage of water or other fluid through the roof and provide stability of the troughs 29c during installation.

Bottom 61 of trough 22c has a plurality of spaced downwardly arcuate parallel bends 67 adapted to form the lower halves of heat collection tubes. The upper halves of the heat collection tubes are formed by spaced arcuate parallel formations 71 of a plate 72 which is adhered to bottom 61 by adhesive 74 spread or laid down in strips between adjacent arcuate or semi-circular formations. As shown in FIG. 4, the semi-circular formations 67, 71 together form tube formations which function in the manner of pipes or tubes to convey the liquid heat transfer medium (e.g. water) from tank 20 to tank 21, through the solar heat collection system. The elements 22c and 72 may be formed of either sheet metal or plastic, and may be formed of extruded plastic, and the adhesive 74 may be formed by an epoxy cement or by an asphaltic cement or of any other suitable adhesive material. Longitudinal gaskets may be provided the locations of adhesive 74 if desired, but it will usually be more economical to merely lay down a strip of adhesive between each of the semi-circular formations 67 and then to dispose the element 72 thereupon to form the seals between adjacent tubular passageways. Alternatively, the adhesive may be applied onto the bottom of the trough with a roller or brush, coating the entire bottom of the trough with adhesive, and then placing the heat collection tube structure onto the adhesive coated trough bottom and pressing it down into place to be sealingly bonded into place. Then, if necessary or desired, a coating of adhesive material or paint could be applied over the upper surface of the heat collection tube structure to further insure against leaks and/or to make the heat collection tube structure of a black or dark color to improve its heat absorption capabilities.

The elements 22c and 72 may be made of any lengths and may be joined in either of the manners shown in FIGS. 3B and 15-16, by overlapping the elements 22c and by providing sleeve type joinders 50 or overlapped joinders for the solar heat collection tube assemblies 72.

In FIG. 5 of the drawings, there is shown a form of trough 22d which is adapted to be formed by plastic extrusion. The trough has bottom 76 and inclined sides 77, 78. Right angled walls 79, 80 and 81, 82 are provided to strengthen the structure, the walls 80, 82 being positioned parallel to the rafters 32. As can readily be understood, the trough assemblies 22d may be assembled one after the other along a series of rafters, the next trough 22d overlapping the previous trough 22d as shown at both sides of FIG. 5. Bottom wall 76 of the trough has formed therealong a series of spaced parallel tubular formations 85. These serve as the heat collection tube elements of the apparatus providing the same functions as the tubes 29 of FIGS. 1 through 3. Again, insulation 59 is provided beneath the trough and around all tubular connections thereto, and end-to-end connections of the troughs and tubes may be provided.

In FIGS. 4 and 5 the troughs 22c and 22d are shown to be covered by a roof sheet 87 in the form of a flat sheet of plastic. The plastic sheets 87 may, of course, be lapped by additional sheets 87 of plastic proceeding upwardly of the roof area, as shown in FIG. 5. The sheets 87 may extend beyond the solar heat collection troughs to completely cover and shield the roof area, so that the roof presents a uniform surface over its entire area to protect the building from the weather. FIG. 6 indicates that the roof covering may be in corrugated form 87a if desired for additional strength or for a different appearance.

In FIGS. 7-9, there are shown three additional embodiments of the invention. Trough 22, as before, has bottom 23 and angular sides 24, 25, each bordered by a flange 26, 27, respectively. A plate 90 has a plurality of parallel upwardly arched formations 91. A tubular element 92 is disposed in each arch formation 91, as shown. The solar heat collection flow medium passes through the tubes 92. The plate 90 is adhered sealingly to bottom 23 of trough 22 by adhesive 74, of the form previously described in connection with FIG. 4 of the drawings.

In FIG. 8, an element 95 having upwardly formed rectangular passageways 96 is adhered to bottom 23 of the trough 22 by adhesive 74 of the type previously described. The heat collection flow medium passes through the passageways 96, bottom 23 of the trough forming the bottoms of the passageways. In both FIGS. 7 and 8, the trough and tube and plate structures may be formed of sheet metal or plastic, as desired.

Referring to FIG. 9, in this form of the apparatus the trough 22e has plural parallel tubes 98 adhered in slot openings of its bottom 23. The bottom 23 is separated to form the openings within which the tubes 98 are disposed, and the tubes are set in place by adhesive 99 placed at all junctions between the bottom 23 edges and the tubes in the manner shown in the drawings. The heat transfer flow medium passes through the tubes 98, as before.

FIG. 10 illustrates an end fitting which may be adapted for the type of flow passageway shown in FIG. 8. The element 95 having plural parallel flow passage formations 96 has cemented or adhered thereto an element 101 of molded plastic, such as polyvinyl chloride plastic. Adapter element 101 is enlarged at its end 102 and is of rectilinear form to be fitted over the lower end of the element 96 as shown, the element 101 being angularly reduced at 103 to a square formation 104 at its lower end. Flanges 105 may be secured by an adhesive to the surfaces upon which the element 95 is disposed. The tube 37 leading to tank 21 is adhesively sealed into formation 104 by adhesive 107, which in this case may be a suitable caulking compound.

An expanded or broken apart perspective view of an apparatus according to the invention is shown in FIG. 11. Trough element 22 has bottom 23, angular sidewalls 24, 25 and flanges 26, 27. Element 109 has bottom webs 110-114 and upper webs 115-118 connected by upstanding sidewalls 119, as shown, and is adhered by adhesive at walls 110-114 to bottom wall 23 of trough 22. Elongate elements 125 are adapted to be nailed or screwed to rafters 32, along flanges 26, 27 of the trough element. Each element 125 has opposite side openings 127, or slots, adapted to receive a trough-shaped gasket 128. A glass or plastic plate 130 is disposed within the gaskets 128 at each side of the apparatus to be sealedly held in place. The elements 125 may be extruded of metal or plastic as deemed suitable. The assembly shown in FIG. 11 provides a very attractive and unique roof surface for a building. As before, the glass covering for the building may be extended to completely cover the roof area. The elements 125 may extend beyond the terminations of the troughs 22.

A roof covering made up of elements 125 and panels 130 as shown in FIGS. 11 and 12, is shown also in FIGS. 3A, 3B and 3C of the drawings. The elements 125 in FIGS. 3A, 3B and 3C are screwed or nailed to the rafters 32 as shown in FIG. 12. An edge panel 126 (FIG. 3C) which may have a downturned edge 126a is disposed beneath the lower ends of elements 125 and extends angularly upwardly a sufficient distance that leakage at the roof edge will not occur. Panel 126 may be formed of plastic or sheet metal, or of a composition roofing material, preferably one of the former. At the top of the roof (FIG. 3A), a shaped peak cover strip 128 is provided to prevent leakage along the peak of the roof. This may be formed of plastic or sheet metal, or any other suitable material, again preferably one of the former.

Referring to FIG. 12 of the drawings, troughs 22 are assembled upon rafters 32 as before described. The element 131 has flat portions 132 and upwardly arched portions 133, parallely disposed. Insulation 59 is disposed beneath the trough elements 22. The elongate elements 125 as shown in FIG. 11 are shown screwed to the rafters 32 by screws 135 disposed through suitable screw openings through the tops of elements 125 and through the bottom slot openings 136 therein provided. The screws extend through punched or drilled openings through the trough flanges, as will be understood by the skilled artisan. Element 131 is affixed to bottom 23 of each trough element by strips of adhesive 74, as earlier described.

The roof panels 137 are of a honeycomb structure, instead of the plain flat form of panels 130 of FIG. 11. Either of these alternative forms of roof panels may be used in connection with any of the different forms of troughs and solar heat collection tubes herein disclosed, or the upper roof surface may be provided by continuous or lapped sheets as shown in FIGS. 4 and 5.

Figure 17:
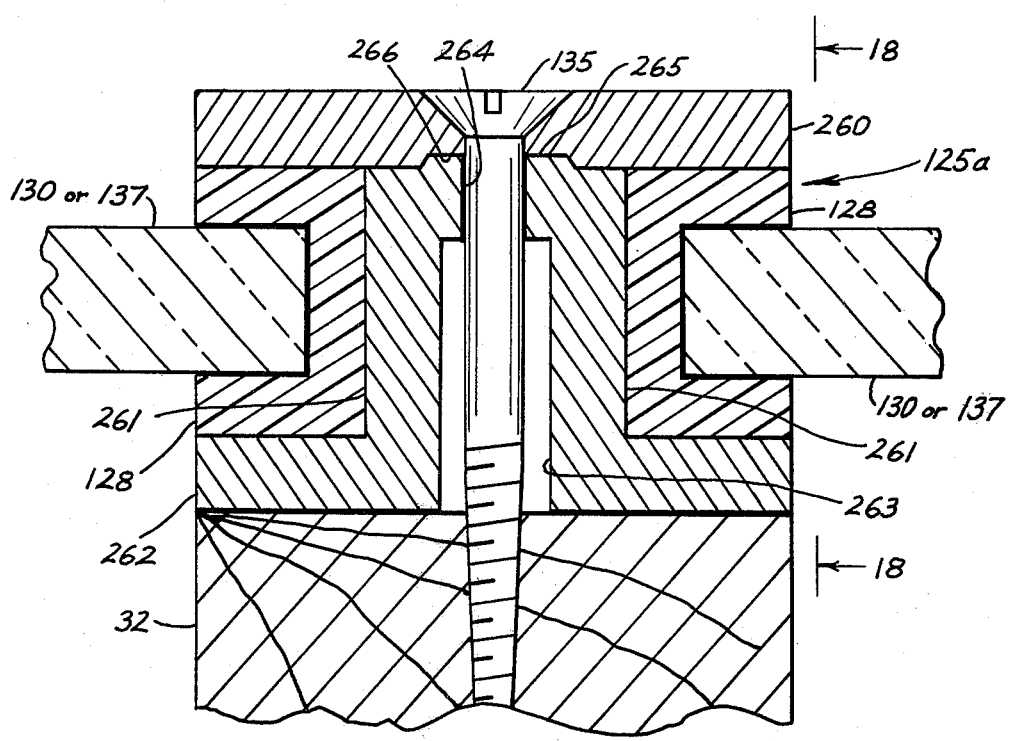
FIG. 17 is an enlarged vertical cross section showing a modified form of roof sheathing support strip according to the invention.

In FIG. 17 there is shown a form 125a of elements 125 which is preferred for use if it is desired that the translucent roof panels 130 or 137 be more readily removable and replaceable. Elements 125a have the same general form as the elements 125, but have an upper flange part 260 which is removable so that the panels 130 or 137 and gaskets 128 may be removed or replaced by movements transverse to elements 125a. Recessed spaces 261 are provided along elongate body 262, or along each side, to receive gaskets 128. A bottom slot 263 is provided, through which screws 135, or nails, may be inserted along the length of each element 125a. The screws or nails pass into slot 263 through holes 264, which may be provided along the length of each element 125a, or which may be drilled as needed. A raised rib formation 265 is fittedly received in a shallow slot 266 along the underside of removable flange element 260 so that element 260 will be properly aligned along body 262. The sheathing roofing elements 130 or 137 of glass or plastic are received within the gaskets in spaces 261, and both the gaskets and the roof elements may be removed and replaced transversely of the elements 125a, by removal of flange strips 260.

Figure 18:
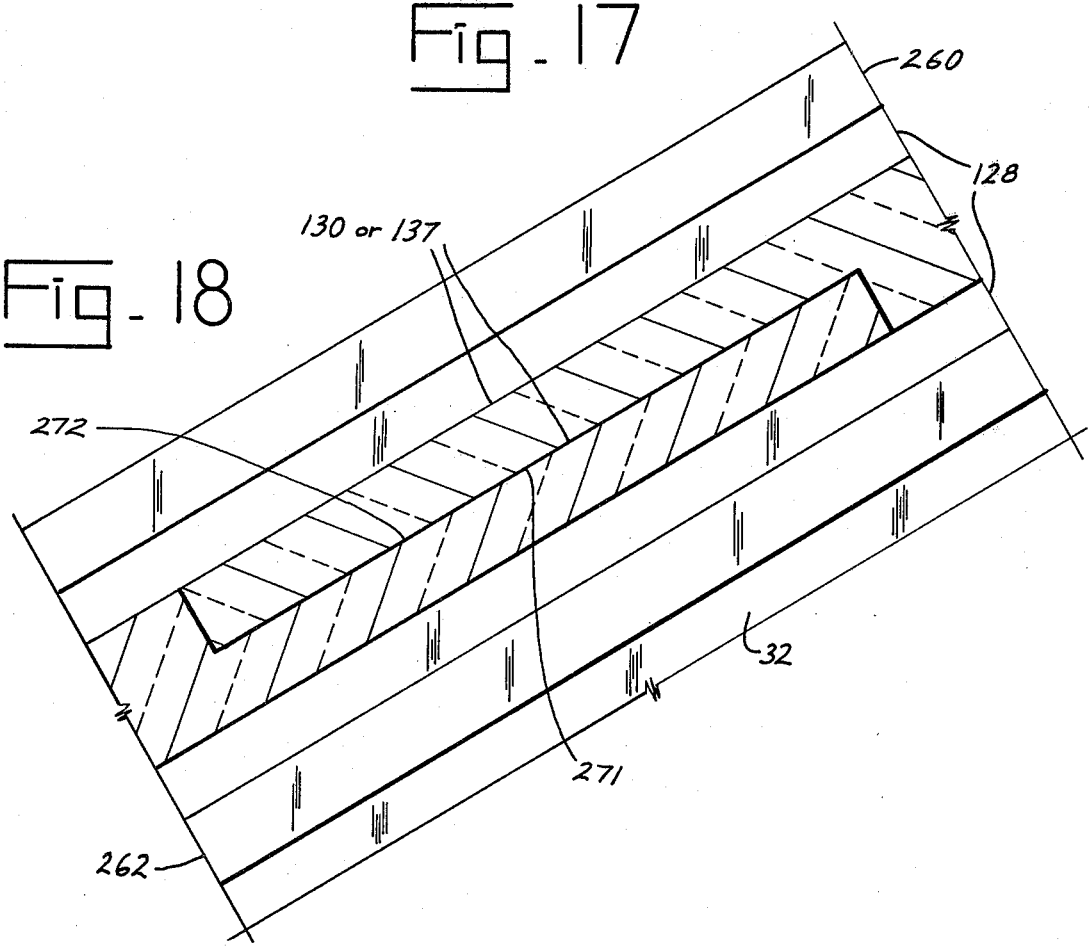
FIG. 18 is a vertical cross section taken at line 18—18 of FIG. 17.

Referring to FIG. 18, there is shown a manner in which the sheathing roofing panels 130 and 137 may be lapped to be joined. An upper panel 130 or 137 has a lower edge relief 271, and a lower panel 130 or 137 has an upper edge relief 272 of corresponding size and shape. The upper and lower panels 130 or 137 are overlapped as shown to prevent leakage of water on the roof therepast. An adhesive may be applied to the overlapped panel surfaces to insure a weathertight seal.

Figure 13:
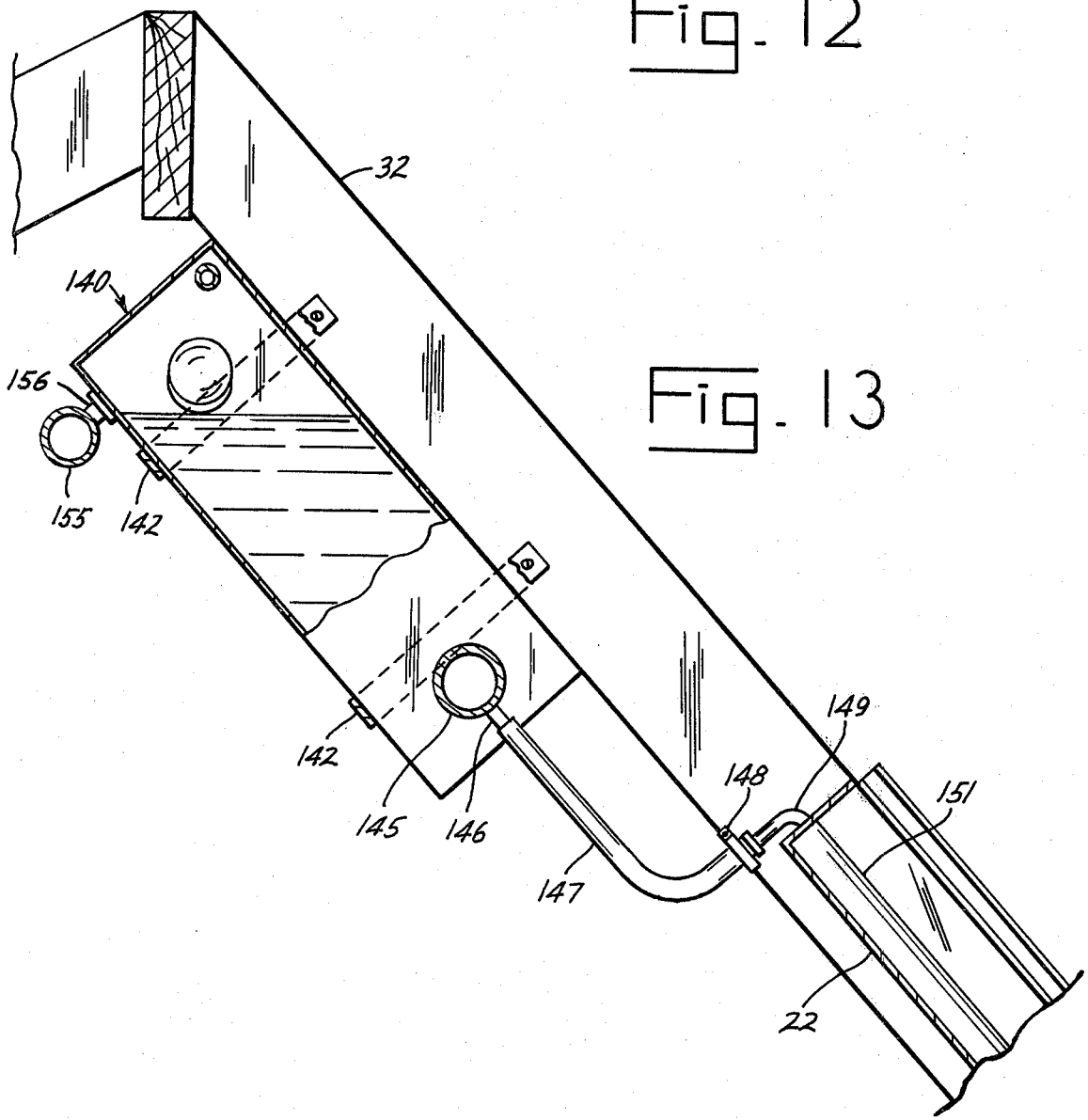
FIG. 13 is an end view illustrating a modification of the upper portion of the invention.

In FIG. 13 there is shown an alternative form for tank 20. The tank 140 is rectangular and is shown to be affixed to rafters 32 by straps 142. The straps 142 may be nailed or screwed to the rafters as shown for support of the tank 140. In this case, a separate tank 140 is shown to be provided for each trough 22. The separate tanks 140 are manifolded together by a pipe 145 extending between adjacent tanks. A nipple 146 is connected to the tube 147 which is secured by clamp 148 to a nipple 149 extending from the heat transfers tube 151 in trough 22. A manifold pipe 155 extends past all of the tanks 140 and has a nipple 156 connected to the upper portion of each tank 140 for return of liquid to the tanks 140 in the manner that pipe 45 returns liquid to tank 20.

The tank 20 shown in FIGS. 1–3A may be replaced by smaller separate tanks each associated with one or more of the troughs. The separate tanks may be manifolded together in a manner similar to that shown in FIG. 13. Such an installation would be simpler for an individual than would be the installation of a single continuous tank as shown in FIGS. 1–3A. The separate tanks 140 of FIG. 13 may be replaced by a single elongate continuous tank, as in FIGS. 1–3A.

Figure 14:
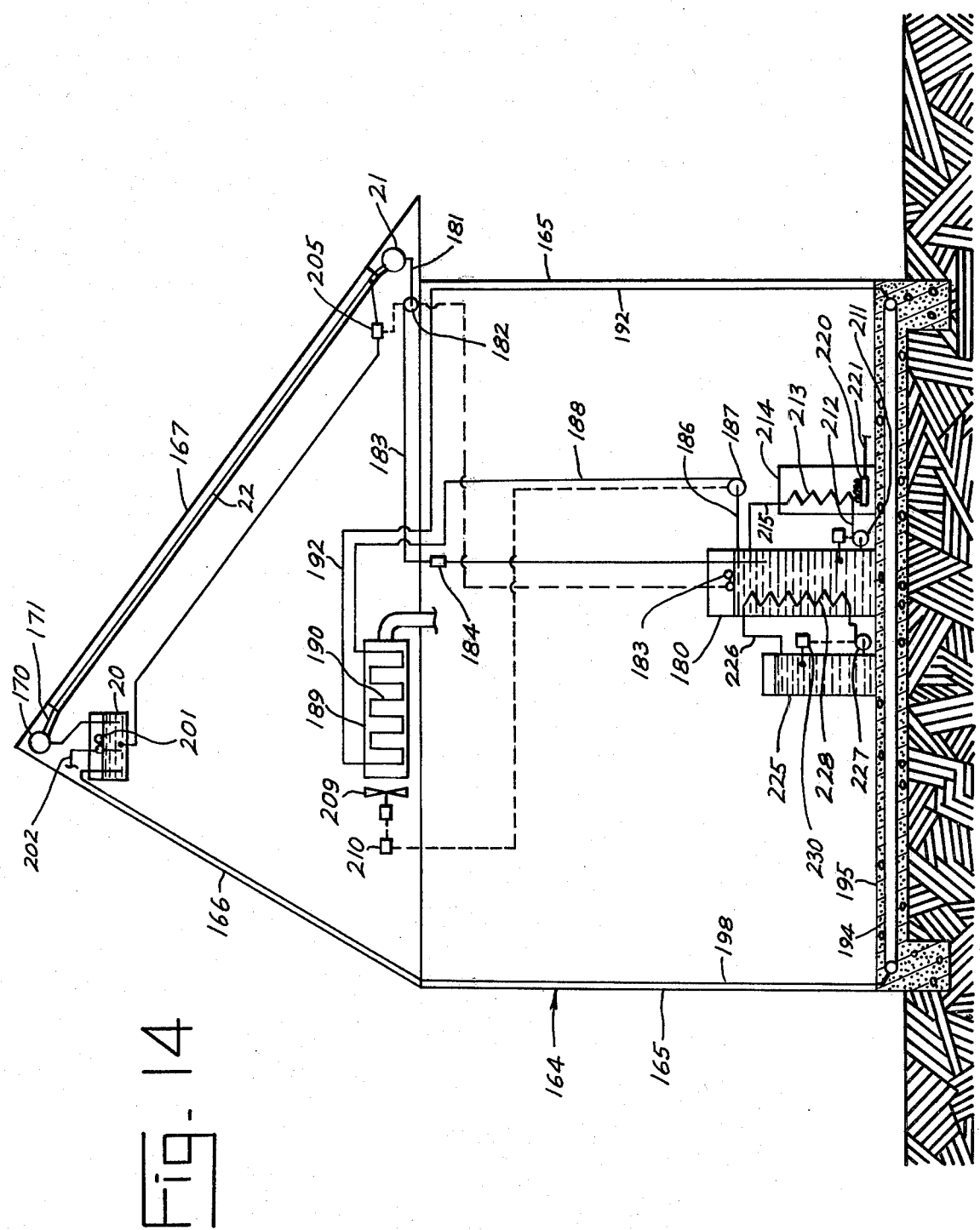
FIG. 14 is a schematic view illustrating a manner of installation and manner of use of apparatus according to the invention.

Referring now to FIG. 14 of the drawings, there is shown in outline a building structure 164 having walls and 165 having roof surfaces 166, 167 shown at different angular inclinations. Tank 20 is shown installed near the peak of the roof. A tubular tank 21 is disposed adjacent the edge of roof 167, either within the eave as shown, or elsewhere within the building. In this case, a manifold tube or pipe 170 is supported within the inside apex of the roof, being connected to the heat transfer tubes within trough 22 by plural conduits 171. A liquid reservoir tank 180 contains a liquid, for example water, which is circulated from tank 21 through pipe 181 pump 182 and pipe 183. A check valve 184 prevents draining of pipe 183 when pump 182 is not operating. Hot water from tank 180 may be circulated through pipe 186, pump 187 and pipe 188 to furnace 189 having pipe coils 190 through which the hot water is circulated. A return pipe 192 conveys the water from the furnace through pipe coils 194 laid in the concrete slab 195 of building 164. Return water from the coils passes through pipe 198 back to tank 20. A float valve 201 permits make up water to enter tank 20 through pipe 202 leading from a suitable source of water should the level in tank 20 become too low. A temperature indicator 205 measures temperature differential between hot water at the lower end of trough 22 and the water in tank 20 to actuate pump 182 when there is sufficient temperature differential. Pump 182 is also actuated to operate by control float 183 when the level of water in tank 180 becomes too low. When hot water is flowing through pipe 188 to furnace 189, fan 209 is caused to operate by controller 210 connected to pump 187. Pump 211, which receives water from tank 180, delivers water through pipe 212 to pipe coil 213 within a furnace 214, the water exiting back to tank 180 through pipe 215. This furnace system may be employed to supply additional heat to the water in tank 180 should the temperature thereof become too low. A gas burner 220 to which fuel gas or oil is supplied through pipe 221 supplies heat to water in pipe coil 213.

A water heater 225 receives hot water from tank 180 through pipe 226 and delivers cooler water back to tank 180 through pump 227 and pipe coil 228. The water flowing through pipe coil 228 is indirectly heated by hotter water in tank 180. The water heater 225 has a suitable piping arrangement for supplying hot water throughout the building structure where required. A temperature sensor 230 actuates pump 227 when the water in tank 225 becomes cooler than required.

The system shown in FIG. 14 is included only to illustrate one example of how the invention may be integrated and used with other equipment, and is not intended to limit the invention or to indicate how the invention must be used.

While preferred embodiments of the invention have been described and shown in the drawings, many modifications thereof may be made by persons skilled in the art without departing from the spirit of the invention, and it is intended to protect by Letters Patent all forms of the invention falling within the scope of the following claims.

I claim:

1. Method for providing solar heating over the entire area of an upwardly facing roof structure and for providing a roof over the entire area of such roof structure, said roof structure having plural parallel spaced rafters sloping downwardly over its entire area, comprising
installing solar heating assemblies on said rafters to bridge across the spaces between adjacent of said rafters over the entire area of said roof structure,
each said solar heating assembly having means along each of its opposite sides adapted for connection to a rafter along each side thereof whereby said solar heating assemblies may be assembled on said rafters,
each said solar heating assembly having fluid inlet means at its upper end and having fluid outlet means at its lower end and having flow conduit means therebetween for use in absorbing heat resulting from solar radiation,
providing a circulating fluid reservoir adjacent the upper ends of said solar heating assemblies along the upper edge of said roof structure and exposing circulating fluid therein to atmospheric pressure,
disposing the ends of said fluid inlet means to be immersed in the circulating fluid in said reservoir so that circulating fluid may be drawn through said fluid inlet means from said reservoir into said flow conduit means by syphoning action,
providing a flow manifold connecting all of said fluid outlet means of said solar heating assemblies along the lower edge of said roof structure,
connecting said flow manifold and said reservoir to heat extracting means for circulating fluid through said conduits between said flow inlet and outlet means and for utilizing heat extracted from said fluid,
and providing sheathing means bridging across said spaces between said rafters and providing a roof over said solar heating assemblies over the entire area of said roof structure,
said method providing solar heat collection over the entire area of said roof structure and providing a roof over the entire area of said roof structure.

2. Method according to claim 1, wherein each said solar heating assembly comprises a trough adapted to bridge between adjacent rafters of said roof structure,
including fitting each said solar heating assembly to extend between the upper and lower edges of said roof structure.

3. Method according to claim 2, including
providing a separate sheathing means to cover each of said solar heating assemblies to together form said sheathing means over the entire area of said roof structure.

4. Method according to claim 2, including
providing plural adjacently overlapped sheathing panels extending over laterally adjacent of said solar heating assemblies to together form said sheathing means over the entire area of said roof structure.

5. Method according to claim 1, including
providing plural adjacently overlapped sheathing panels extending over laterally adjacent of said solar heating assemblies to together form said sheathing means over the entire area of said roof structure.

6. Method according to claim 2,
including syphoning circulating fluid from said reservoir into the upper ends of said conduits through said fluid inlet means,
and pumping fluid from said fluid outlet means through said heat extracting means to said reservoir at a level adjacent said ends of said fluid inlet means and above said fluid outlet means.

7. Method according to claim 1,
including syphoning circulating fluid from said reservoir into the upper ends of said conduits through said fluid inlet means,
and pumping fluid from said fluid outlet means through said heat extracting means to said reservoir at a level adjacent said ends of said fluid inlet means and above said fluid outlet means.

8. Method according to claim 2, wherein the fluid in said first flow manifold is at atmospheric pressure.

9. Method according to claim 2, wherein said fluid is water.

10. Method according to claim 2, including splicing together the ends of solar heating sub-assemblies to extend said solar heating assemblies between the upper and lower edges of said roof structure.

11. Method according to claim 10, including
providing a separate sheathing means to cover each of said solar heating assemblies to together form said sheathing means over the entire area of said roof structure.

12. Method according to claim 10, wherein the fluid in said first flow manifold is at atmospheric pressure.

13. Method according to claim 10, wherein said fluid is water.

14. Method according to claim 1, including
providing a separate sheathing means to cover each of said solar heating assemblies to together form said sheathing means over the entire area of said roof structure.

15. Method according to claim 14,
including syphoning circulating fluid from said reservoir into the upper ends of said conduits through said fluid inlet means,
and pumping fluid from said fluid outlet means through said heat extracting means to said reservoir at a level adjacent said ends of said fluid inlet means and above said fluid outlet means.

16. Method according to claim 14, wherein the fluid in said first flow manifold is at atmospheric pressure.

17. Method according to claim 14, wherein said fluid is water.

18. Method according to claim 1,
including syphoning circulating fluid from said reservoir into the upper ends of said conduits through said fluid inlet means,
and pumping fluid from said fluid outlet means through said heat extracting means to said reservoir at a level adjacent said ends of said fluid inlet means and above said fluid outlet means.

19. Method according to claim 1, wherein the fluid in said first flow manifold is at atmospheric pressure.

20. Method according to claim 1, wherein said fluid is water.

21. Method according to claim 1, including
providing plural adjacently overlapped sheathing panels extending over laterally adjacent of said solar heating assemblies to together form said sheathing means over the entire area of said roof structure.

22. Method according to claim 1,
including syphoning circulating fluid from said reservoir into the upper ends of said conduits through said fluid inlet means,
and pumping fluid from said fluid outlet means through said heat extracting means to said reservoir at a level adjacent said ends of said fluid inlet means and above said fluid outlet means.

23. Method according to claim 22, wherein the fluid in said first flow manifold is at atmospheric pressure.

24. Method according to claim 22, wherein said fluid is water.

25. Method according to claim 1, wherein the fluid in said first flow manifold is at atmospheric pressure.

26. Method according to claim 26, wherein said fluid is water.

27. Method according to claim 1, wherein said fluid is water.

* * * * *